US012737875B2

(12) United States Patent
Hyatt et al.

(10) Patent No.: US 12,737,875 B2
(45) Date of Patent: Sep. 15, 2026

(54) ADAPTIVE SYSTEM AND METHOD FOR INSPECTION OF IMAGED ITEMS

(71) Applicant: Siemens Aktiengesellschaft, Munich (DE)

(72) Inventors: Yonatan Hyatt, Tel Aviv (IL); Dagan Eshar, Tel Aviv (IL); Ran Ginsburg, Ramat Gan (IL); Gil Zohav, Beer Sheva (IL)

(73) Assignee: Siemens Aktiengesellschaft, Munich (DE)

( * ) Notice: Subject to any disclaimer, the term of this patent is extended or adjusted under 35 U.S.C. 154(b) by 575 days.

(21) Appl. No.: 18/019,264

(22) PCT Filed: Aug. 3, 2021

(86) PCT No.: PCT/IL2021/050940
§ 371 (c)(1),
(2) Date: Feb. 2, 2023

(87) PCT Pub. No.: WO2022/029771
PCT Pub. Date: Feb. 10, 2022

(65) Prior Publication Data

US 2023/0281791 A1 Sep. 7, 2023

Related U.S. Application Data

(60) Provisional application No. 63/060,195, filed on Aug. 3, 2020.

(30) Foreign Application Priority Data

Aug. 3, 2020 (IL) .......................................... 276478

(51) Int. Cl.
*G06T 7/00* (2017.01)
*G06T 7/136* (2017.01)

(52) U.S. Cl.
CPC .............. *G06T 7/001* (2013.01); *G06T 7/136* (2017.01); *G06T 2207/20081* (2013.01); *G06T 2207/20084* (2013.01)

(58) Field of Classification Search
CPC .................... G06T 7/001; G06T 7/136; G06T 2207/20081; G06T 2207/20084
USPC .......................................................... 382/141
See application file for complete search history.

(56) References Cited

U.S. PATENT DOCUMENTS

2019/0236463 A1 8/2019 Nakata et al.
2019/0294923 A1 9/2019 Riley et al.
2020/0110982 A1 4/2020 Gou et al.
2020/0111210 A1 4/2020 Maximo et al.
2020/0160153 A1 5/2020 Elmoznino et al.
2020/0193552 A1 6/2020 Turkelson et al.
2020/0234428 A1 7/2020 George et al.
2022/0335588 A1* 10/2022 He ......................... G06V 10/87
2023/0005132 A1* 1/2023 Okahara .................. G06T 5/50

* cited by examiner

*Primary Examiner* — Gabriel I Garcia
(74) *Attorney, Agent, or Firm* — Cozen O'Connor

(57) ABSTRACT

A visual inspection system and method are provided in which a reference image of an item is processed and based on the processing a pre-trained model is adjusted to obtain an adapted model. The adapted model, rather than the pre-trained model, is then used to process an inspection image of a same-type item, to obtain inspection information which may then be output to a user.

20 Claims, 7 Drawing Sheets

ADAPTIVE SYSTEM AND METHOD FOR INSPECTION OF IMAGED ITEMS

CROSS-REFERENCE TO RELATED APPLICATIONS

This is a U.S. national stage of application No. PCT/IL21/50940 filed 3 Aug. 2021. Priority is claimed on Provisional Application No. 63/060,195 filed 3 Aug. 2020, and Israeli Application No. 276478 filed 3 Aug. 2020, the contents of which are incorporated herein by reference in their entirety.

FIELD

The present invention relates to visual inspection processes, for example, image-based inspection of items on a production/inspection line.

BACKGROUND

Inspection during production processes helps control the quality of products by identifying defects and acting upon their detection, for example, by fixing them or discarding defected parts, and is thus useful in improving productivity, reducing defect rates, and reducing re-work and waste.

Traditionally, inspection tasks were performed by human workers. With the growing success of machine learning techniques, more and more of these tasks are now done by machines, in modern factories.

Initially, machine learning solutions were especially designed for specific production lines of specific items. These solutions required reducing the effects of environment variables (e.g., lighting, temperature, humidity and external interference) as much as possible, demanding from the designers of such solutions, a high level of expertise in many different domains, from engineering to machine learning. In addition, traditional machine learning solutions often require training on all possible defect types, which requires knowing in advance all possible defects and entails hard manual labor to provide enough defected examples. Thus, implementing these specifically designed solutions is usually not immediate, and may require shutting down the inspection line for a long time, and once implemented, the solution is not flexible and cannot be used for other items and/or other inspection lines.

Modern machine learning techniques, such as deep learning, can better handle a variability of items and environment. However, these techniques require computationally-heavy and long (sometimes weeks or more) training methods using a large number of examples (tens of thousands to millions) of both defect-free and defected items.

While it is technically possible to train a single, general model, which will learn to detect a huge number of different defects, by feeding it with millions of varied defected samples, this solution will fail to perform well on multiple production lines, since similar anomalies in an item's appearance may be considered permitted variations in some cases, but regarded as defects, in other cases.

Another solution may include retraining an entire network on specific items and then using the re-trained network for defect detection of these specific items. This solution, however, requires a strong machine, or a connection to a strong machine (e.g., cloud server), as well as using a large number of examples for training. Thus, this solution cannot be easily implemented in-field at a manufacturing plant, on edge devices which are usually low computation and low memory, cheap and typically unconnected devices. Also, implementing such a solution requires obtaining and annotating the images for the specific items, which together with the training time itself, may take a long time.

SUMMARY

A novel approach to visual inspection is proposed, in which a machine learning model, which is expertly pre-trained for inspection tasks by using examples of different, non-specific items, may be reused for inspection of specific items with no expert knowledge required. This model may be used in any inspection line and environment, even if it was not specifically trained for the specific items, specific inspection line and/or specific environment.

Embodiments of the invention provide a pre-trained adaptable inspection machine that does not have to be re-trained on specific items but rather is automatically fine-tuned in-field for specific characteristics of specific items and inspection lines, resulting in an adapted machine. The adapted machine, rather than the pre-trained inspection machine, is then used for inspection tasks. The automatic tuning and creation of an adapted machine for inspection tasks enables even a non-expert user to easily set up an inspection system for different items.

The fine-tuning in-field, which builds on top of the pre-trained machine, requires a very small number of user-confirmed samples and is computationally economical, enabling the use of a low computation, inexpensive edge device for inspection of a plurality of different items in different inspection environments, with no expert knowledge required.

In one embodiment, there is provided a visual inspection method which includes processing at least one reference image of an item and based on the processing, adjusting a pre-trained model to obtain an adapted model. The method further includes processing an inspection image of a same-type item, using the adapted model, to obtain inspection information. The inspection information may then be output.

The processing of the (one or more) reference image may include, for example, encoding the reference image.

In some embodiments, an adaptation component (which is configured to cause a change to at least one parameter of the pre-trained model) is used to process the reference image(s). The adaptation component may cause a change to a latent space of the pre-trained model and/or to an embedding of the pre-trained model and/or to a metric function of the pre-trained model and/or to a network architecture of the pre-trained model. In some embodiments the adaptation component causes a change to an input inspection image.

A parameter of the pre-trained model (which can be changed by the adaptation component) may include a parameter of a classifier used to detect a defect in an image and/or, for example, a threshold of determining that an inspection image represents a defect.

Also provided is a system for visual inspection. In one embodiment, the system includes an adaptation component to receive a reference image of an item and to cause a change to a parameter of a pre-trained model based on the reference image. The change produces an adapted model which includes a classification component configured to receive an inspection image of a same-type item and an output module to receive input from the classification component and to output inspection information to a user based on the input from the classification component. The classification component may include an embedding module and defect detector module. The system may also include an input module. The adaptation component may cause a change to one or a combination of the input module, embedding module, defect detector module and output module of the pre-trained model.

The system may include an auto-encoder to process the reference image prior to being received at the adaptation component.

The adaptation component may cause a change to one or a combination of a latent space of the pre-trained model, an embedding of the pre-trained model, a metric function of the pre-trained model and a network architecture of the pre-trained model.

BRIEF DESCRIPTION OF THE FIGURES

The invention will now be described in relation to certain examples and embodiments with reference to the following illustrative figures so that it may be more fully understood. In the drawings.

DETAILED DESCRIPTION

Figure 1:
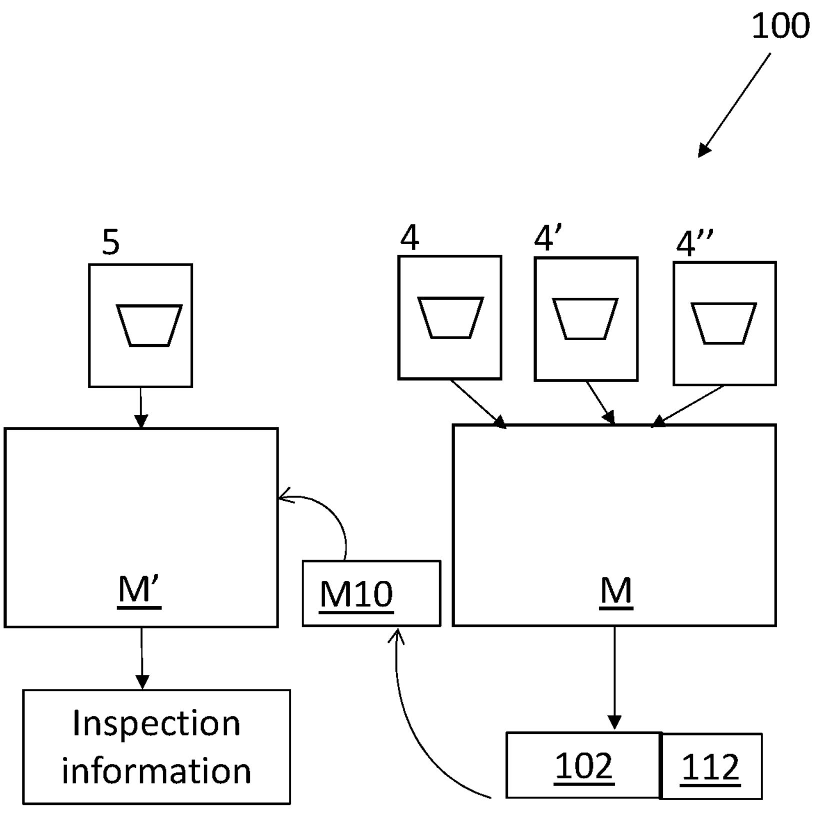
FIG. 1 schematically illustrates a system according to embodiments of the invention.

Embodiments of the invention provide an adaptable learning machine that can be automatically adapted to provide predictions for inspection tasks relating to a specific item. The automatic adaptation enables using the learning machine for visual inspection of any item, in any inspection environment, even by a non-expert user.

The following terms will be used in the description:

"Setup stage" is a stage in a visual inspection process, in which images of examples of a same-type manufactured item (which is typically supplied by a user), are provided to a visual inspection machine for processing. The setup stage is typically an initial stage, followed by an inspection stage, but setup can also be performed after the inspection stage has begun.

"Inspection stage" is a stage, in the visual inspection process, which follows an initial setup stage and/or setups preformed after the inspection stage has begun, in which images of inspected items, which are of the same type as the examples used in the initial setup stage, are analyzed for inspection tasks.

"Inspection tasks" relate to functions of an inspection process, typically of the inspection stage, for example, defect detection, defect location, quality assurance, sorting and/or counting, gating, etc.

"Inspection information" relates to information that can be derived or predicted from analysis performed while carrying out inspection tasks.

"Reference images" relates to images of items whose status has been confirmed by a user. For example, images obtained during a setup stage, may be considered "confirmed" since the items were supplied by a user. Additionally, images approved by a user or discarded by the user, e.g., via a user interface device, may be considered "confirmed".

"Inspection images" relates to images of items that are of the same type as the examples used in a setup stage, however, items in an inspection image are of an unknown status.

"Status" of an item or image relates to inspection information results or predictions relevant to the imaged item. For example, a status of an item may be "defected" or "defect-free".

"Same-type items" refers to items or objects which are of the same physical makeup and are similar to each other in shape and dimensions and possibly color and other physical features. Typically, items of a single production series, batch of same-type items or batch of items in the same stage in its production line, may be "same-type items". For example, if the inspected items are sanitary products, different sink bowls of the same batch are same-type items.

A "defect" may include, for example, a visible flaw on the surface of the item, an undesirable size of the item or part of the item, an undesirable shape or color of the item or part of the item, an undesirable number of parts of the item, a wrong or missing assembly of interfaces of the item, a broken or burned part, an incorrect alignment of the item or parts of the item, a wrong or defected barcode, serial number, text, icon, etc., and in general, any difference between a defect-free sample and the inspected item, which would be evident from the images, to a user, namely, a human inspector. In some embodiments a defect may include flaws which are visible only in enlarged or high-resolution images, e.g., images obtained by microscopes or other specialized cameras.

A visual inspection process may include a setup stage and an inspection stage. In the setup stage, examples of a manufactured item of the same type and at a known status (e.g., in some embodiments, the examples are same-type defect-free items), are placed in succession within a field of view (FOV) of (one or more) cameras, to provide reference images. For example, an inspection line may include a conveyor belt on which items are placed, such that movement of the conveyor belt brings the items into the FOV of the camera, in succession. Images of the items may be displayed to a user, such as a technician, inspector and/or inspection line operator.

In the inspection stage, which typically follows an initial setup stage, inspected items, which are of the same type as the items in the reference images and which are of an unknown status (e.g., may or may not have defects), are imaged in succession, to provide inspection images. These images are analyzed using computer vision techniques (e.g., machine learning processes) to detect defects in the items and for other inspection tasks.

Although particular examples of setup and inspection procedures or stages of a visual inspection process are described herein, it should be appreciated that embodiments of the invention may be practiced with other setup and/or inspection procedures of visual inspection processes.

Some embodiments of the invention provide a solution that includes two stages; an "in-office" stage and an "in-field" stage.

The first "in-office" stage, which is typically performed by an expert developer, includes training a general network using a large amount of examples (typically, images of different type items in different statuses) to obtain a pre-trained model.

This stage typically requires expertise, uses intensive computational resources and takes a long time to finalize. However, according to embodiments of the invention, once trained, the model can be re-used multiple times in-field, at any inspection line, for any item and with varying environmental conditions, without any further training.

The second "in-field" stage is typically performed by a non-expert user, at an inspection line (e.g., in a manufacturing plant), during a visual inspection process. In-field the pre-trained model is automatically adapted to provide inspection information for a specific item and/or inspection environment. In-field processes may run on a typically low computation, inexpensive edge device.

Exemplary adaptable visual inspection systems and methods that provide inspection information, according to embodiments of the invention, are schematically illustrated in the figures described below.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

As used herein, the terms "component", "module", "system" and the like refer to computer-related entities; hardware, firmware, software, a combination of software and hardware, or the execution of software. For example, a module may include a process running on a processor, a thread of execution, a program, and/or a computer. For example, both an application running on a computing device and the computing device can be a module. One or more modules can reside within a processor and/or thread of execution, and a module can be localized within one computer or distributed between multiple computers. Modules can execute from various computer readable media having various data structures stored thereon. Modules may communicate via a wired or wireless connection. For example, modules may communicate via a network such as the Internet and other systems, via signals with one or more data packets (e.g., data and/or signals from one module interacting with other modules in a local system and/or a distributed system). Communication may be via local and/or remote processes.

In some examples a component or module may also refer to an element of a neural network, such as, a node, layer, weight, input, output, etc., as further described below.

Unless specifically stated otherwise, as apparent from the following discussions, it is appreciated that throughout the specification discussions utilizing terms such as "analyzing", "processing," "computing," "calculating," "determining," "detecting", "identifying", "learning" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Unless otherwise stated, these terms refer to automatic action of a processor, independent of and without any actions of a human operator.

In one embodiment, which is schematically illustrated in FIG. 1, a visual inspection system 100 includes a model M which was trained, typically in-office. For example, model M was trained on training data which includes images of multiple types of items, each of the different types of items possibly of a different status (e.g., one item may be defect-free whereas another item may be defected).

Training or learning of models is performed in order to minimize an error of the model network output. During training, training data is repeatedly input to the neural network and an error of an output of the neural network for the training data and a target is calculated. The error of the neural network is back-propagated from an output layer to an input layer of the neural network in order to decrease the error, and weights of nodes of the neural network may be updated according to the back-propagation.

At an inspection line, "in-field", during a setup stage and/or throughout the inspection process, reference images 4, 4' and 4" of a single type of item are presented to the pre-trained model M and processed by model M and processor 102. The single type of item (in images 4, 4' and 4") may be, but is not necessarily, included in the multiple types of items in the training data used to pre-train model M. Thus, a system, according to embodiments of the invention, may provide inspection information about an item that was not used in training of the pre-trained model.

The system 100 also includes an adaptation component M10. In one embodiment, reference images 4, 4' and 4" are input to the pre-trained model M and are processed, possibly by a component of the pre-trained model. The pre-trained model is then adjusted based on the processing. In one example, at least one of reference images 4, 4' and 4" is processed by a component of model M to produce a prediction which is then input (e.g., by processor 102) to the adaptation component M10. In another example, at least one of reference images 4, 4' and 4" is processed directly by adaptation component M10.

Based on the processing of the reference images (directly at the adaptation component or via another component), adaptation component M10 may then cause adjustments to the pre-trained model M (e.g., by causing changes to parameters of the model M, as further exemplified below) to produce an adapted model M'.

The adapted model M' receives an inspection image 5 and provides inspection information relevant to inspection image 5.

The inspection information may be output. For example, the inspection information may be presented to a user, e.g., via a user interface device which may be in communication with processor 102.

A user interface device (not shown) may include a display, such as a monitor or screen, for displaying images, instructions and/or notifications to a user (e.g., via text or other content displayed on the monitor). The user interface device may also be designed to receive input from a user. For example, the user interface device may include a monitor and keyboard and/or mouse and/or touch screen, to enable user input. User input may include, for example, an indication of status of an image (e.g., the user may indicate if the image includes a defected or defect-free item) and/or an indication of a region of interest (ROI), which may include the whole item or a specific region on the item. An ROI may be an area on the item which is associated with defect detection. For example, an ROI may be an area on the item in which a user requires defect detection or an area on the item in which the user does not require defect detection.

An indication of an ROI input by a user may include, for example, a bounding shape, such as a polygon (e.g., rectangle) or circular shape, enclosing the imaged item close to the borders of the item or enclosing the region. The bounding shape may include, for example, a colored line, a broken line or other style of line, or polygon or other shape surrounding the region.

Processor 102 may include, for example, one or more processors and may be a central processing unit (CPU), a graphics processing unit (GPU), a digital signal processor (DSP), a field-programmable gate array (FPGA), a microprocessor, a controller, a chip, a microchip, an integrated circuit (IC), or any other suitable multi-purpose or specific processor or controller. Processor 102 may be locally embedded or remote.

Processor 102 may receive image data (which may include data such as pixel values that represent the intensity of reflected light as well as partial or full images or videos) of items from one or more camera(s), from a storage medium (e.g., memory unit 112 which is described below) and/or processor 102 may receive data that is transmitted from another computing device such as an image database.

Processor 102 is typically in communication with a memory unit 112. Memory unit 112 may store at least part of the image data.

Memory unit 112 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

In some embodiments the memory unit 112 stores executable instructions that, when executed by processor 102, facilitate performance of operations of processor 102, as described herein.

At least one module of processor 102 may be configured to process neural networks. Such processing may include, for example, inputting data for learning in a deep neural network (DNN), feature extraction from input data, loss calculation, weight update of neural networks, e.g., by back-propagation, etc. Processor 102 may perform learning functions of a network and/or data classification using network functions, etc. Network functions may be distributed and processed in one or more modules of processor 102.

Models and/or other components, according to embodiments of the invention, may transmit/receive data, such as image data, to/from other computing devices, servers, and the like. For example, model M may receive training image data from a training image database. In addition, communication between a plurality of computing devices may be enabled so that learning of network functions is distributed in each of the plurality of computing devices, and data classification using network functions may be a distributed process.

As described above, adapted model M' is produced in-field from model M, based on processing of reference images. In some embodiments, the in-field stage is performed during a setup stage of the inspection process. In this stage only one or a few reference images of same-type items are presented to the model that was pre-trained during the in-office stage. Possibly, several different same-type items may be presented in a single setup stage. The same-type items may be of the same status (e.g., defect-free) or of different statuses (e.g., defect-free and defected). In some embodiments, reference images may be presented to model M throughout the inspection process, not necessarily only during the setup stage. For example, an inspection image labeled by a user and/or by the inspection machine (e.g., either as defected or defect-free) during the inspection stage, may then be presented to the pre-learned model or to the adaptation component M10, as a new reference image.

As schematically illustrated in FIG. 1, during the in-field stage, an adaptation or adjustment step is applied on at least one component (e.g., network) of the pre-trained model M, based on the reference images 4, 4' and 4". The adaptation step builds on top of the pre-trained model and improves the model's performance on the specific type of item presented in the reference images, enabling a small number of examples to largely impact the pre-trained model on one hand, while maintaining pre-trained knowledge, on the other hand.

In some embodiments, the adaptation or adjustment step, unlike a training step, is not an iterative back-propagating process, rather the adjustment step attempts to improve performance of the model on the specific reference images (e.g., 4, 4' and 4") by updating parameters of the network without training (e.g., without back-propagating any error).

The adapted model M' (and not the pre-trained model M) is used to process an inspection image 5 to obtain inspection information regarding the item imaged in the inspection image. Inspection information may relate to an entire image (e.g., is the item in the image defected or defect-free), to an ROI in the image (e.g., to an area defined by a bounding shape), to blobs (a group of pixels having similar values but which are different from the pixels surrounding them. E.g., a blob may include a set of pixels defining a region that is candidate to be a defect), to individual pixels (e.g., the probability of a pixel being part of a defect), etc. The inspection information can be output, e.g., to be displayed to a user.

Figure 2A:
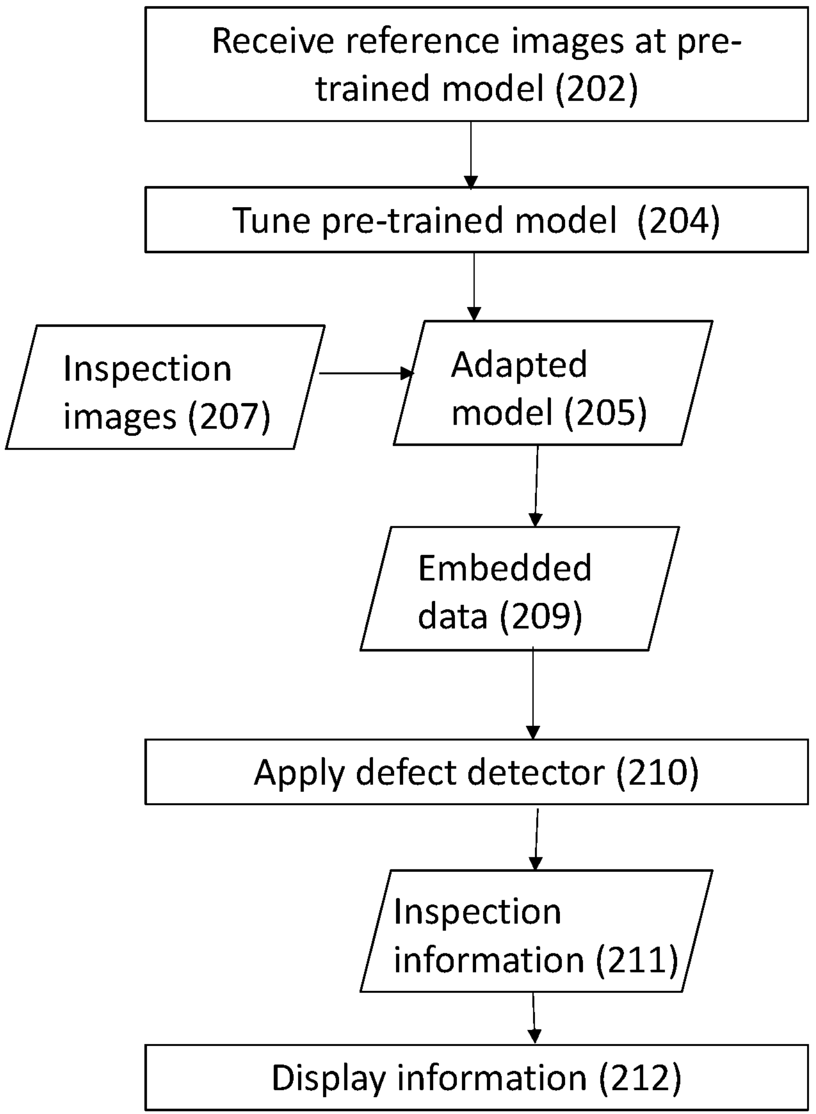
FIGS. 2A and 2B schematically illustrate methods according to embodiments of the invention.

An example of a method, which may be carried out by processor 102 according to embodiments of the invention, is schematically illustrated in FIG. 2A.

Figure 2B:
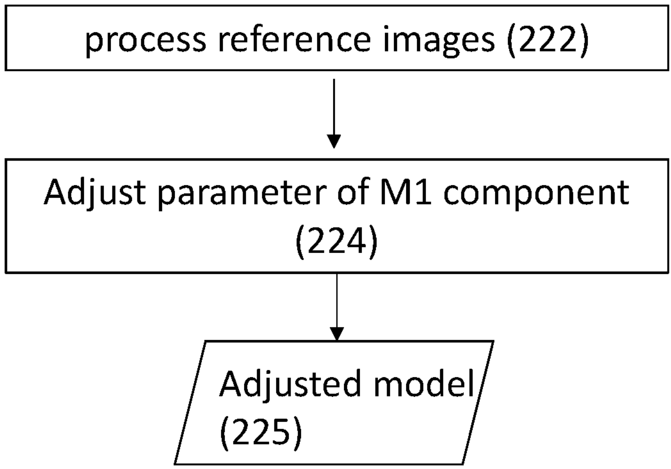

In step 202 reference images are input to a pre-trained model (such as model M). In step 204 the pre-trained model is adjusted or tuned based on the input reference images to produce an adapted model 205 (such as adapted model M'). One example of these steps is schematically illustrated in FIG. 2B, where the input reference images are processed (step 222) and based on this processing, one or more parameter of one or more component of the pre-trained model is adjusted (step 224) thereby producing an adapted model 225.

A parameter that may be adjusted in step 224, may include, for example, a characteristic of a neural network and/or any factor that sets the conditions of operation of the model. For example, a parameter may include a component or sub component of a model such as, nodes and layers as well as weights, representations, inputs and outputs.

Returning to FIG. 2A, inspection images 207 may be input to the adapted model 205. Processing of the inspection images by the adapted model 205 produces data, for example, embedded data 209, onto which a defect detector can be applied (step 210) to produce inspection information 211 regarding the inspection image. The inspection information 211 may then be output (step 212), e.g., by displaying or otherwise conveying to a user the inspection information and/or information processed from the inspection information.

Thus, according to embodiments of the invention, a reference image in the setup stage and an inspection image in the inspection stage, are each processed by a different model. In some embodiments a reference image is processed by a pre-trained model M and/or by an adaptation component M10 or another input model to adapted model M', whereas the inspection image is processed only by adapted model M'.

Typically, models M and M' and adaptation component M10 include a neural network.

"Neural networks" and "network functions", may be used interchangeably. A neural network may consist of a set of interconnected computational units, which may generally be referred to as nodes or neurons. A neural network includes at least one node. Nodes (or neurons) that make up neural networks may be interconnected by one or more links (or edges).

Within a neural network, one or more nodes connected via a link may form a relationship of input node and output node. The concept of an input node and an output node may be relative; a first node in an output node relationship to a second node may be in an input node relationship with a third node, and, for example, the other way around. One or more output nodes can be connected to a single input node via a link, and vice versa.

In an input node and output node connected via one link, a value of the output node may be determined based on data input to the input node and based on a weight assigned to the link interconnecting the nodes. The weight may be varied to enable the neural network to perform different functions. For example, if one or more input nodes are interconnected by a link to one output node, the output node is set to the values input to the input nodes associated with the output node and to the weighted links corresponding to the respective input nodes.

Characteristics of a neural network may be determined according to the number of nodes and links in the neural network, the relationship between the nodes and the links, and the value of the weight assigned to each of the links. For example, two neural networks having the same number of nodes and links but having different weight values of the links, will be different from each other.

A visual inspection machine or system, according to embodiments of the invention, may include one or more neural networks, each including one or more nodes. Some of the nodes that make up the neural network may construct one layer based on distances from the initial input node, for example, a set of nodes with a distance x from the initial input node, can configure layer number x. The distance from the initial input node may be defined by the minimum number of links required to reach a node from the initial input node. In other embodiments the order of a layer in the neural network may be defined differently. For example, a layer of nodes may be defined by distance from the final output node.

The initial input node may be one or more nodes into which data is directly input (without going through a link). Alternatively, in a relationship between nodes based on a link, the initial input node may be one or more nodes having no other input nodes connected to them by a link. Similarly, the final output node may be one or more nodes that do not have an output node.

Nodes of a neural network, other than the initial input node and the final output node, are called hidden nodes. Neural networks that can be used according to embodiments of the invention, may include a decreasing or increasing number of hidden nodes in each layer, progressing from the input layer to the output layer.

A deep neural network (DNN) may refer to a neural network including a plurality of hidden layers in addition to an input layer and an output layer. Deep neural networks include convolutional neural networks (CNNs), recurrent neural networks (RNNs), restricted Boltzmann machines (RBMs), and deep belief networks (DBNs), Q networks, U networks, Siamese networks and the like.

In one embodiment, the neural network may include a deconvolutional neural network (DCNN) to perform segmentation of image data. The deconvolutional neural network performs an inverse convolution operation and outputs a feature extracted from the convolutional neural network to a feature map associated with the original data. Thus, if, for example, a step of convolution and pooling reduces layer dimensions to (width/2, height/2), the deconvolution can restore (width, height) from (width/2, height/2). This may be required for segmentation where defect segmentation may be required to be output in the same resolution as the original input image.

Figure 3:
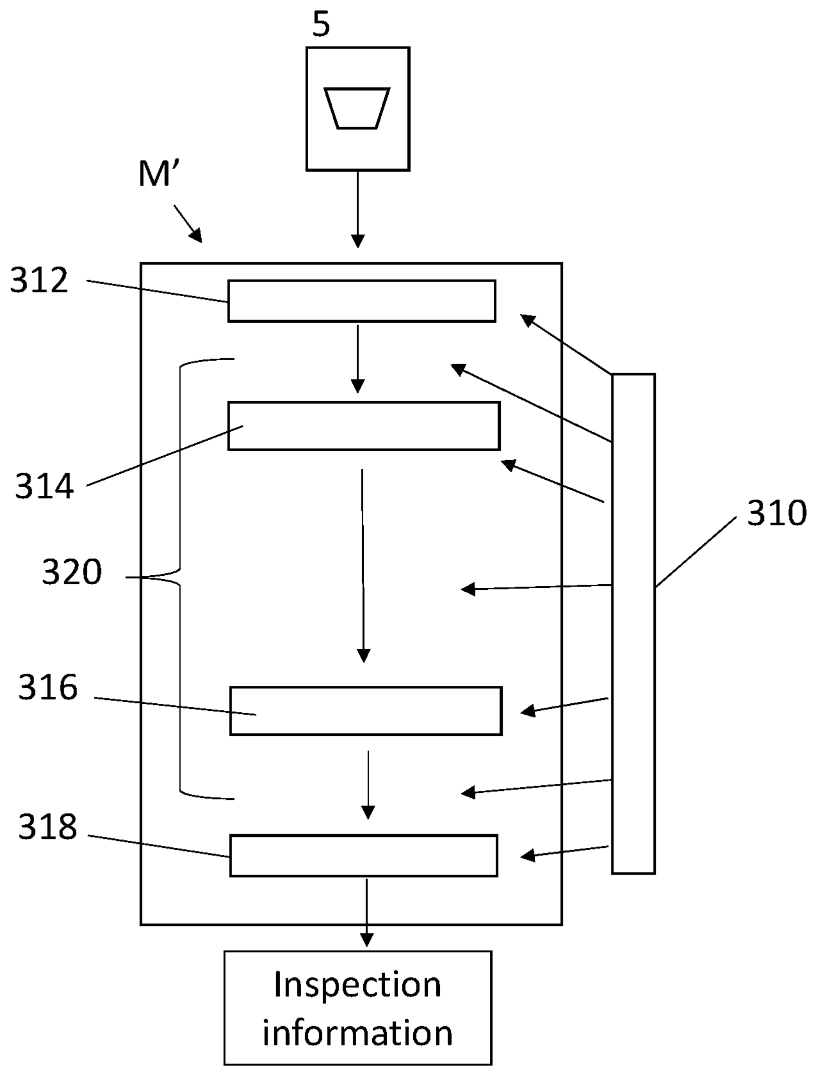
FIG. 3 schematically illustrates an adapted learning machine, according to embodiments of the invention.

In one embodiment, adapted model M', which is schematically illustrated in FIG. 3, includes an input module 312, a classification component 320 (which can include an embedding module 314 and a defect detector module 316) and an output module 318. Each of the components of model M' may include one or more neural networks, e.g., as described above.

One or more adaptation component(s) 310 can change one or more parameters of one or more components of model M to obtain model M', based on processing of one or more reference image. The adaptation component 310 may change one or more parameters of model M by, e.g., adding, removing, changing a value of or replacing a parameter of the pre-trained model, e.g., changing or replacing components or sub components such as weights, nodes, layers, etc.

Additionally, adaptation component 310 can change parameters of model M by causing changes to input/output of components of model M. In some embodiments, interim inputs and/or outputs of M are changed. Thus, for example, outputs of hidden layers (of the now adapted model M') may be input to the next hidden layer only after they have been changed.

In one embodiment, adaptation component 310 may cause changes to a component of input module 312, such that parameters of images input to adapted model M', via input model 312, are changed.

Input module 312 may include an image processing component to process an inspection image prior to it being received at the classification component 320. The image processing component may modify statistics of input data (e.g., images). For example, changes to input images (namely to inspection images 5) may be performed by input module 312, based on prior processing of reference images (e.g., images 4, 4' and 4"). Changes to parameters of input images may include, for example, adjusting coefficients or changing pixel values for normalization, colorization, contrast, balance, lighting-fixing, as well as, aligning, cropping, warping an image or parts of it to specific coordinates. In some embodiments changes to input images may include emphasizing parts of an input image or deleting part of the input image.

Embedding module 314, which is used to embed the reference image and the inspection image, includes, according to one embodiment of the invention, a learned network representation of a sample in latent space. In some embodiments, the embedding module 314 takes as input an inspection image and possibly a varying number of reference images and creates a single representation of a fixed size. This representation may be done on original input images, or on one or more latent layers.

Embedding module 314 may include one or more neural networks as described above, e.g., a CNN, possibly in a Siamese network architecture.

In some embodiments, processing of a reference image may cause changes to embedding module 314 such as adjustment of one or more weights of the neural network of embedding module 314. In other embodiments processing of a reference image may cause adding, removing, or replacing sub components of embedding module 314 (such as specific layers, sequences of layers, or any other functions of the neural network).

Defect detector module 316 receives input from the embedding module 314 and outputs information (e.g., predictions) relating to an input image. In one embodiment defect detector module 316 determines existence and location of a defect in an inspection image, from input received from embedding module 314.

Defect detector module 316 may include, for example, any of the neural networks described above. In some embodiments, defect detector module 316 includes neural networks that may be used for image segmentation. Image segmentation, which is the process of partitioning a digital image into multiple segments in order to simplify and/or change the representation of an image into something more meaningful and easier to analyze, assigns a label to pixels in an image such that pixels with the same label share certain characteristics. Image segmentation may be used, in embodiments of the invention, to identify the existence and/or location of a defect, by separating pixels or blobs depicting a defect from other pixels of the image and extracting location information of the separated pixels. In addition, image segmentation may assist in visualizing and displaying defects to a user.

In some embodiments, processing of a reference image may cause changes to defect detector module 316 such as adjustment of one or more weights of the neural network of defect detector module 316. In other embodiments, processing of a reference image may cause adding, removing, or replacing components such as classification/comparison components.

Output module 318 includes a processing component, which takes input from defect detector module 316 and may process the predictions from defect detector module 316 to obtain inspection information relating to an imaged item. In some embodiments, based on processing of a reference image, the adaptation component 310 may cause changes to parameters of output module 318, such as, changes to thresholds, statistics or rules (e.g., changing a threshold, statistic or rule for determining that an image/blob/pixel represents a defect).

Output module 318 may be in communication with a user interface device to display to a user the inspection information.

In some embodiments, an encoder-decoder architecture and/or autoencoders may be used. In one example, an auto-encoder and a classifier are pre-trained on an input of multiple samples of different type items. In-field the auto-encoder can be used on references of a single-type item, and the adaptation component 310 can receive as input the encoded information and use it to create model M' to be used for the inspection of samples of the same-type item, without any in-field training. Thus, processing of a reference image may include encoding at least one reference image.

In some embodiments, processing of a reference image may be done based on input from a user such that at least some components of model M may be tuned (e.g., via adaptation component 310) based on input from a user, to produce an adapted model M'. For example, changes to parameters of the input module 312 may be performed based on an indication of ROI input by a user on a reference image. The changes to the input module, caused by input of an indication of ROI by the user, may modify an input image (e.g., an inspection image) to enable, for example, defect detection specifically within the ROI.

In some embodiments, adapted model M' includes a subset of elements of model M. The subset of elements (e.g., layers or other elements, as described above) may be distributed in one or more different locations, e.g., in the embedding module 314 and/or in the defect detector module 316.

In some embodiments, adapted model M' includes new components, which can be added in one or more locations.

Adaptation techniques that can include, for example, addition, multiplication, removal, replacement, changing, etc., of components and parameters, are schematically exemplified in FIGS. 4A-4C below.

In-field, elements of model M (possibly, a subset of elements of model M) are adjusted to obtain an adaptive model. One or a combination of adaptation techniques may be used. Examples of adaptation techniques include using dynamic networks, inferring by using inferring networks, transfer learning and other techniques that enable only a few components to tune a large number of parameters. Adaptation techniques may use prediction or inference. A pre-trained hypernetwork can be used to predict an adaptation based on the pre-trained model M. The adaptation updates parameters of the model and attempts to decrease the error, but not by actually backpropagating any error.

Figure 4A:
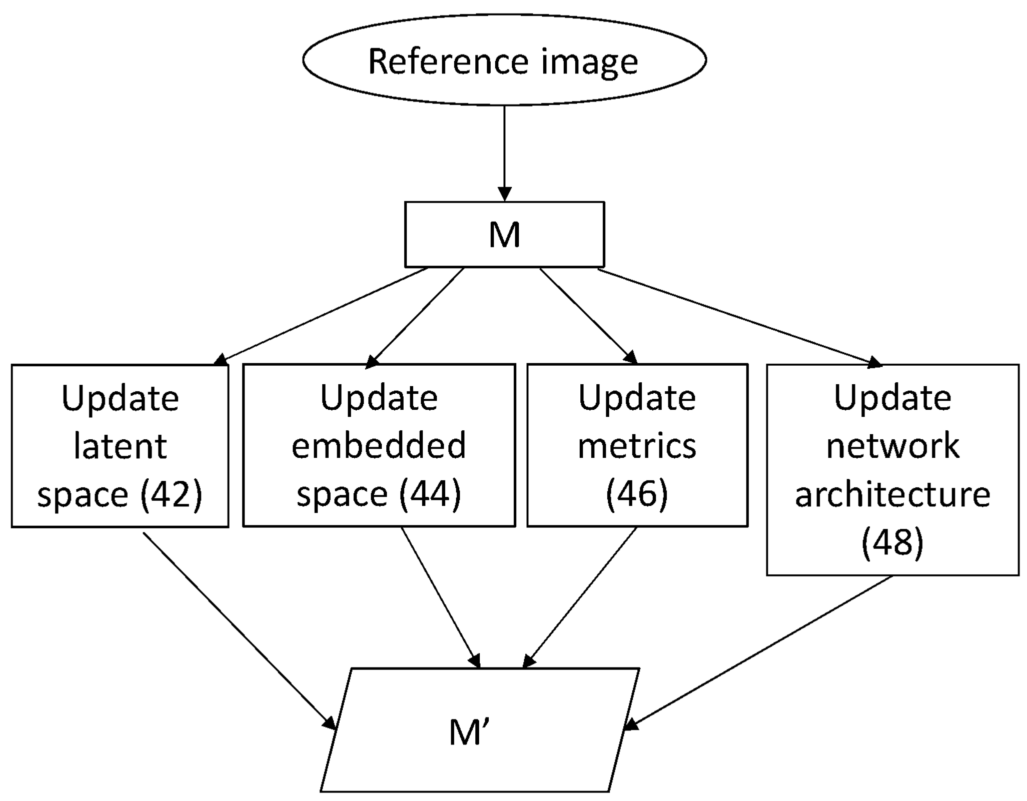
FIGS. 4A-C schematically illustrate exemplary adaptation techniques, according to embodiments of the invention.

In one embodiment, which is schematically illustrated in FIG. 4A, input of a reference image to model M (e.g., via an input module) causes changes to parameters of components of the model M (e.g., at one or more of the input modules, a classification component and/or output module), which produce an adapted model M'.

Model M may include a network in which each component (e.g., operation/function/layer) is applied on inputs from a previous component. Processing reference images, according to embodiments of the invention, can cause changes to the weights of each component and/or determine which components will be in use in the adapted model M', and which ones will not be used.

The changes may include, for example, updating the latent space (42) and/or updating the embedding (44) and/or updating metric functions (46) and/or updating the network architecture (48).

Updating the latent space (42) may include, for example, adjusting weights of components of model M.

In one embodiment, updating the latent space (42) may include adding new "tuning-blocks" for each new optimization objective (for example, optimization objectives may include, full image classification, blob classification, per pixel classification, classifier trained on general items, classifier trained on specific items, etc.). Each additional tuning-block is added to the output, multiplied by a coefficient which tunes towards a desired optimization objective. The multiplication coefficient can be a trade-off between over-fitting to new data, and relying on pre-learned, maybe less relevant, data.

Adding tuning blocks, which are a subset of the entire network, enables updating, in-field, a limited number of components, rather than the entire network.

In other embodiments, new layers may be added to the network, on top of the existing ones. New layers can be added in one or more different locations in model M, e.g., in an embedding module and/or in a defect detector module.

In one embodiment, model M may include residual layers. In a residual neural network (e.g. ResNet) additional skip connection connects the output of a layer with its input. During training, the weights adapt to amplify the previously-skipped layer. In the simplest case, only the weights for the adjacent layer's connection are adapted, with no explicit weights for the upstream layer. In some cases, an explicit weight matrix may be learned for the skipped connection. In this embodiment, the residual layers are pre-trained together with other components of model M. However, in-field only the residual layers are tuned on a specific item (e.g., the item in the reference images), resulting in a much lower number of weights to tune.

In another embodiment, model M includes mask weights, which may be binary flags, indicating which weight (or layer or sub-network or any other component) should or should not be used for each image of a same-type item (e.g., the items in reference images and inspection images). The weights' values are learned during pre-training of model M, however, in-field, only the binary flags are learned. Masked weights can replace the standard weights anywhere in the model, thus adding merely a small computation effort (one bit per masked weight).

Updating the embedding (44) may include performing changes on input data and/or to its representation. For example, the training data that is used to train model M, has its own typical statistics (e.g., color distribution, brightness, contrast). These statistics usually do not perfectly match images from a specific type of item. Thus, new inspection images can be normalized in order to get their statistics closer to the data statistics of the reference images. Normalization can be done, for example, by scaling and translating the data towards the target mean and standard-deviation of the reference images in-field, without prior training. Normalization can be applied, e.g., to a new input image or to one or more embedding layers.

In one embodiment, a sub-network component can be trained to normalize an image and/or embedding, based on data from a new item.

Updating distance metrics (46) typically refers to updating parameters of a metric classifier that learns to compare samples, with regard to their labels. I.e., the samples will be "closer" if they share the same label, and more distinct if they have different labels. Latent spaces can be trained to obey the distance metric, forcing new samples to be closer to previously presented samples with the same label, and thus, probably to be classified the same way. For example, a metric classifier can learn to group together images of items labelled as defected and items labelled as defect-free, and to push these two groups apart from each other (create a larger distance between them). This can be done on the original input images, on embeddings, or on various other model components. This will create a distance metric that is conditioned on the existence or absence of a defect in an image. In this way, when an image of a new item is seen, it will be classified correctly with higher probability.

Embedding and/or weights and other components of the metric classifier can be adjusted, according to embodiments of the invention.

Updating the network architecture (48) may include using a combination of techniques, where several layers or operations can be selected from different parts of the network, and the rest discarded or given a lower weight, while also adding new layers. An example of such an adaptation technique includes a modified version of Neural-Architecture-Search in which the architecture is inferred by the adaptation component.

Once in the field, given images and defects that are distributed differently from the training data, only the specific adjusted and/or newly added layers may be trained, enabling a small number of examples (reference images) to largely impact the network, while retaining pre-trained knowledge.

Figure 4B:
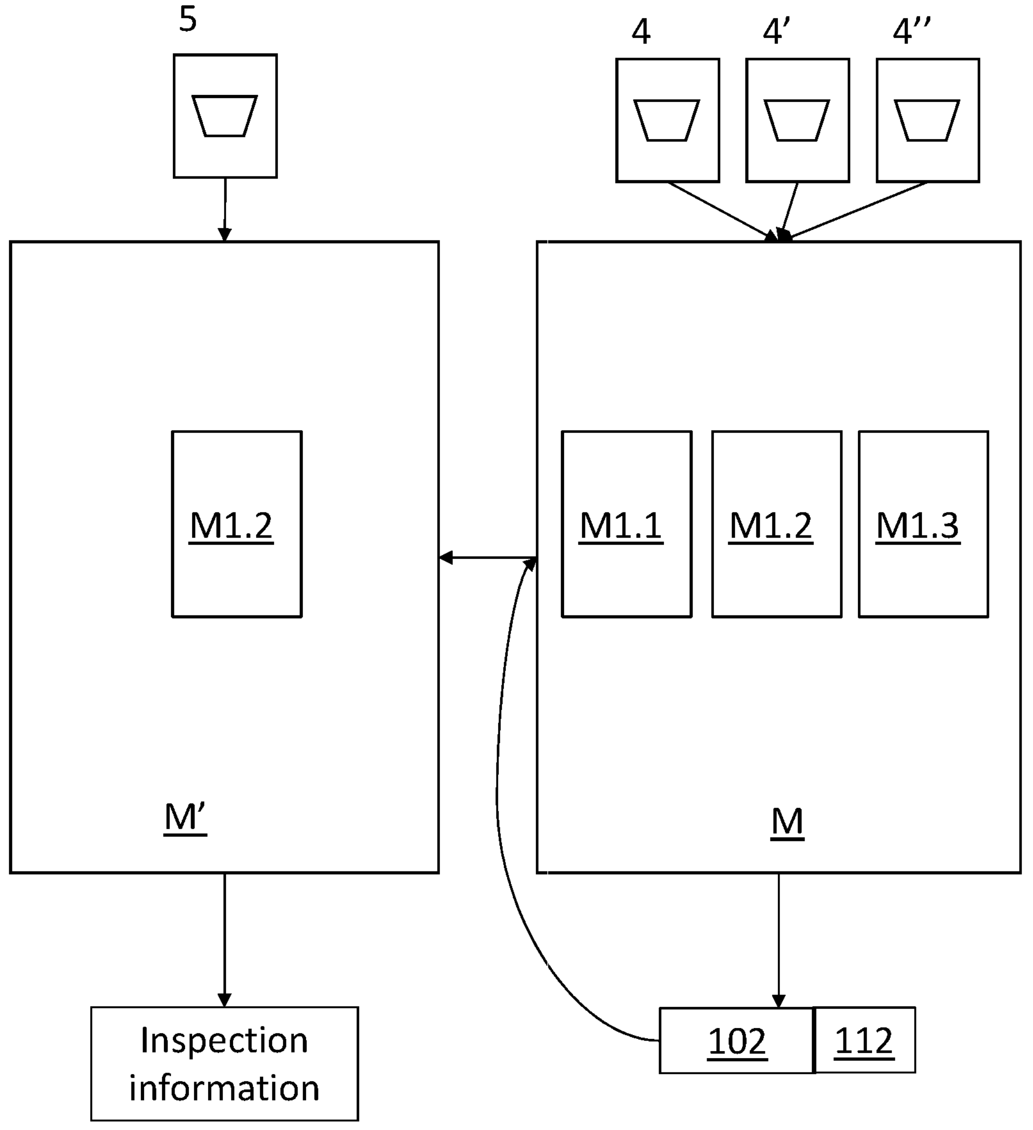

In other embodiments, updating the neural architecture (48) may be done, for example, as schematically illustrated in FIG. 4B, by choosing which model to use in-field, from several pre-trained models. Model M may include several sub-models M1.1, M1.2 and M1.3 which are trained in-office. In-field, reference images 4, 4' and 4" are processed, e.g., by using model M. Based on the output of model M processor 102 determines that sub-model M1.2 is optimal for performing inspection tasks on the reference images. Model M will thus be adjusted to provide an adapted model M' which includes only sub-model M1.2. Sub-models M1.1 and M1.3 are ignored or removed. Adapted model M' which includes sub-model M1.2 can then be used to provide inspection information related to an inspection image 5.

Figure 4C:
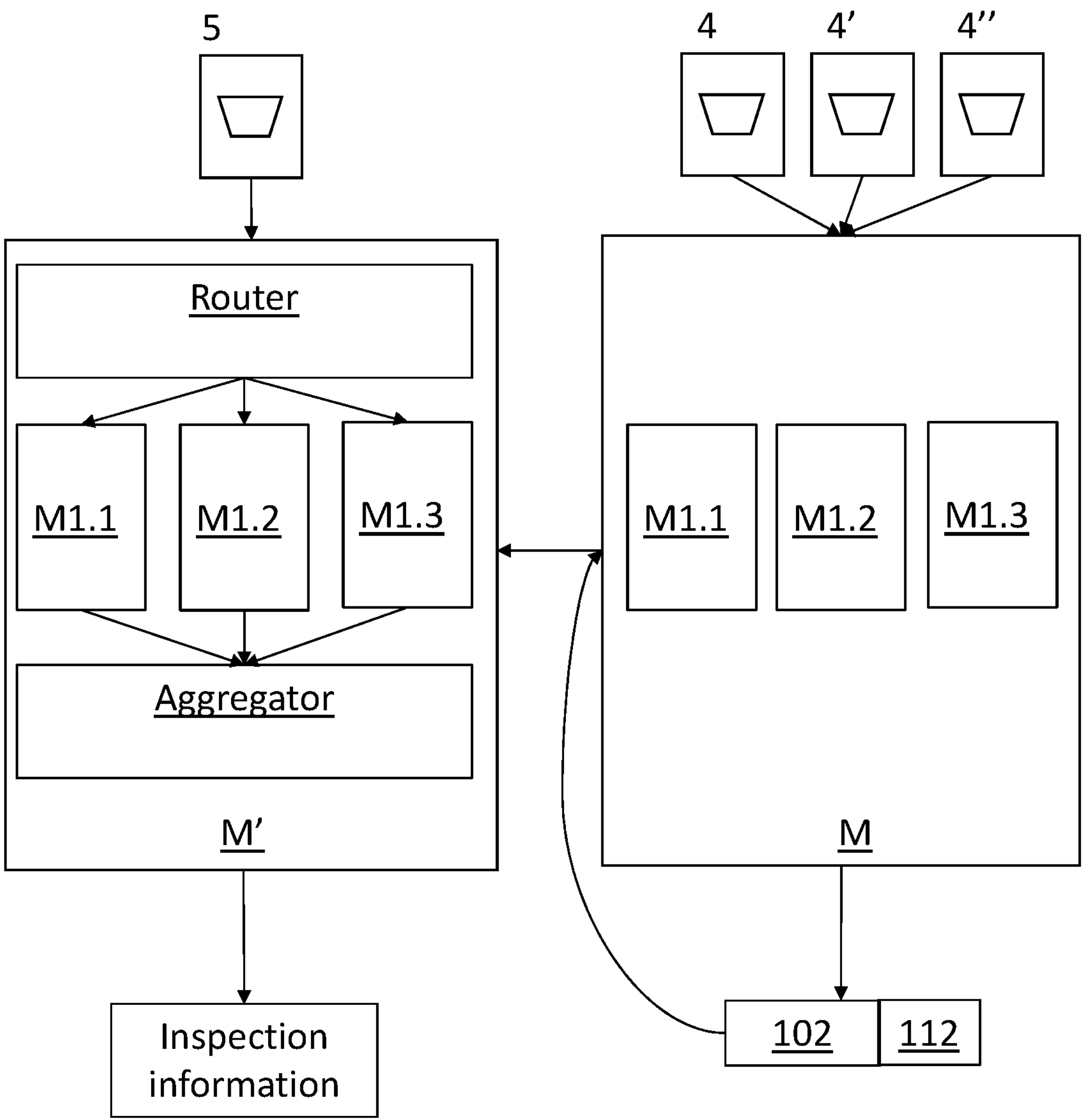

In another embodiment, which is schematically illustrated in FIG. 4C, a combination of pre-trained sub-models may be used.

Model M includes several sub-models M1.1, M1.2 and M1.3 which are trained in-office. In-field, reference images 4, 4' and 4" are processed, e.g., by using model M. Based on the output of model M, processor 102 determines which combination of sub-models to use.

Optionally, a router may be used to decide, based on processing of the input reference images, which combination of sub-models M1.1, M1.2 and M1.3 to use. For example, the router can determine different coefficients to each link that connects two components of the network. These coefficients define how much the linked component contributes to the calculation of the next component. For example, a coefficient of zero means that the component is not used at all in the calculation. Thus, after the weights of the individual sub-models M1.1, M1.2 and M1.3 have been pre-trained, the contribution of each of the sub-models can be tuned in-field. The router may be set, e.g., during the setup stage or may be dynamic and may change during the inspection process.

In other embodiments, an aggregator may be used, which takes the results of all sub-models M1.1, M1.2 and M1.3 and decides how to use these results. For example, the result provided by the majority of models may be used.

The adaptation techniques exemplified above and others may be used to produce an adapted model for visual inspection according to embodiments of the invention. The adapted model, rather than a pre-trained model may be used for obtaining inspection information.

The invention claimed is:

1. A visual inspection method comprising:

(i) processing at least one reference image of an item;

(ii) based on the processing, adjusting a pre-trained model, without re-training on specific items, to obtain an adapted model by updating parameters of the pre-trained model without an iterative back-propagating process;

(iii) processing an inspection image of a same-type item, using the adapted model, to obtain inspection information; and (iv) outputting the inspection information.

2. The method of claim 1, wherein the processing of the at least one reference image comprises encoding the reference image.

3. The method of claim 1, further comprising:

using an adaptation component to process the at least one reference image, the adaptation component being configured to cause a change to at least one parameter of the pre-trained model, and the change comprising one or a combination of: adding, removing, changing a value of or replacing a parameter of the pre-trained model.

4. The method of claim 3, wherein the adaptation component causes a change to a latent space of the pre-trained model.

5. The method of claim 3, wherein the adaptation component causes a change to an embedding of the pre-trained model.

6. The method of claim 3, wherein the adaptation component causes a change to a metric function of the pre-trained model.

7. The method of claim 3, wherein the adaptation component causes a change to a network architecture of the pre-trained model.

8. The method of claim 3, wherein the adaptation component causes a change to an input inspection image.

9. The method of claim 3, wherein the at least one parameter of the pre-trained model comprises a parameter of a classifier used to detect a defect in an image.

10. The method of claim 3, wherein the at least one parameter of the pre-trained model comprises a threshold of determining that an inspection image represents a defect.

11. A system for visual inspection, the system comprising:

an adaptation component which receives a reference image of an item and causes a change to a parameter of a pre-trained model based on the reference image, without re-training on specific items, the change updating parameters of the pre-trained model without an iterative back-propagating process to produce an adapted model, and the adapted model comprising a classification component configured to receive an inspection image of a same-type item; and an output module which receives input from the classification component and outputs inspection information to a user based on the input from the classification component.

12. The system of claim 11, further comprising:

an auto-encoder configured to process the reference image prior to being received at the adaptation component.

13. The system of claim 11, wherein the adaptation component causes a change to a latent space of the pre-trained model.

14. The system of claim 11, wherein the adaptation component causes a change to an embedding of the pre-trained model.

15. The system of claim 11, wherein the adaptation component causes a change to a metric function of the pre-trained model.

16. The system of claim 11, wherein the adaptation component causes a change to a network architecture of the pre-trained model.

17. The system of claim 11, wherein the adaptation component causes a change to a combination of a latent space of the pre-trained model, an embedding of the pre-trained model, a metric function of the pre-trained model and a network architecture of the pre-trained model.

18. The system of claim 11, wherein the adaptation component infers a design of a network architecture of the adapted model.

19. The system of claim 11, further comprising:

an input module which includes an image processing component, to process the inspection image prior to being received at the classification component.

20. The system of claim 11, wherein the classification component comprises:

an embedding module which embeds the reference image and the inspection image; and a defect detector module which receives input from the embedding module and which determines existence and location of a defect in the inspection image, from the input.

* * * * *